United States Patent
Ahn et al.

(10) Patent No.: US 9,971,579 B2
(45) Date of Patent: May 15, 2018

(54) PROCESSOR AND COMMAND PROCESSING METHOD PERFORMED BY SAME

(71) Applicant: SAMSUNG ELECTRONICS CO., LTD., Suwon-si (KR)

(72) Inventors: Min-wook Ahn, Seoul (KR); Won-sub Kim, Anyang-si (KR); Jin-seok Lee, Seoul (KR); Seung-won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 14/964,069

(22) Filed: Dec. 9, 2015

(65) Prior Publication Data
US 2016/0170807 A1   Jun. 16, 2016

(30) Foreign Application Priority Data
Dec. 10, 2014   (KR) ........................ 10-2014-0177830

(51) Int. Cl.
*G06F 9/45* (2006.01)

(52) U.S. Cl.
CPC ............ *G06F 8/4441* (2013.01); *G06F 8/441* (2013.01)

(58) Field of Classification Search
None
See application file for complete search history.

(56) References Cited

U.S. PATENT DOCUMENTS 7,013,459 B2 *   3/2006   Kuch .................. G06F 9/44557
                                                       717/151

* cited by examiner

*Primary Examiner* — Qamrun Nahar
(74) *Attorney, Agent, or Firm* — Sughrue Mion, PLLC (57) ABSTRACT

A command processing method and processor performing the method are provided. The method includes: determining a priority of a variable of a program based on a usage frequency of the variable; determining an address at which a value of the variable is stored in a memory based on the priority of the variable; and generating a command that relates to the variable based on a bit string length of the address.

20 Claims, 10 Drawing Sheets

```
/// Variables
int a;
int b;
int c __attribute((frequent));  — 410
int main() {
  int i;
  b += a + c;
  // loop
  for (i=0; i<10000; ++i) { c+= 10; }
  for (i=0; i<100000; ++i) { a+= 100; }
  ...
  return 0;
}
```

```
setlo r1 ← &a;
sethi r1 ← &a;
st m[r1+0] ← r2;
```

520

```
setlo r1 ← &a;
st m[r1+0] ← r2;
```

530

```
sta m[rx+&a]
```

FIG. 6

```
int global;
int foo ( )   {
  int local;
  for ( )   {
    global=
    ...
  }
}
``` file1.c

```
setlo r2 ← &global;
sethi r2 ← &global;
st m[r2+0] ← r1;
```

720

```
setlo r2 ← &global;
st m[r2+0] ← r1;
```

730

```
st m[r2+&global] ← r1;
```

PROCESSOR AND COMMAND PROCESSING METHOD PERFORMED BY SAME

CROSS-REFERENCE TO RELATED APPLICATION

This application claims priority from Korean Patent Application No. 10-2014-0177830, filed on Dec. 10, 2015 in the Korean Intellectual Property Office, the disclosure of which is incorporated herein by reference in its entirety.

BACKGROUND

1. Field

Apparatuses and methods consistent with exemplary embodiments relate to a processor and a command processing method performed by the same.

2. Description of the Related Art

When a variable is used in a program, an area for the variable is allocated to a memory. To write or read a value of a variable, an address of the variable is to be stored in a register, and a command for writing or reading the value of the variable to or from the address referred to from the register is required.

The greater the number of commands with respect to a frequently used variable, the more a processing speed of a program is delayed. Thus, an apparatus and method for processing commands with respect to a frequently used variable are required.

SUMMARY

Exemplary embodiments provide a processor and a command processing method performed by the same, in which the number of commands used with respect to a frequently used variable is reduced in order to improve program performance.

According to an aspect of an exemplary embodiment, there is provided a command processing method including: determining a priority of a variable of a program based on a usage frequency of the variable; determining an address at which a value of the variable is stored in a memory based on the priority of the variable; and generating a command that relates to the variable based on a bit string length of the address.

The determining the priority of the variable may include determining, when a usage frequency of a first variable of the program is greater than a usage frequency of a second variable of the program, the first variable to have a priority that is higher than a priority of the second variable.

A bit string length of a first address at which a value of the first variable is stored may be shorter than a bit string length of a second address at which a value of the second variable is stored.

The determining the priority of the variable may include obtaining a respective usage frequency of each of a plurality of variables by using at least one from among a dependence analysis and a loop depth analysis.

The command processing method may further include: calculating a layout of the memory to which respective values of a plurality of variables of the program are allocated; and determining, in the calculated layout, whether the respective values of the variables are validly stored in the memory by using a command with respect to the plurality of variables.

The command processing method may further include, when the respective values of the plurality of variables are determined as being validly stored in the memory, accessing the plurality of variables by using the command.

The command processing method may further include, when the respective values of the plurality of variables are determined as being not validly stored in the memory, providing an error message.

The command processing method may further include selecting one from among a plurality of variables of the program, and the determined the priority of the variable may include determining the priority of the selected variable.

The selecting the one from among the plurality of variables may include selecting the one from among the plurality of variables based on at least one from among profile data and preset information.

The address at which the value of the variable is stored may be determined based on a reference position, and the reference position may be variable.

According to an aspect of another exemplary embodiment, there is provided a processor including a memory; and a controller configured to determine a priority of a variable of a program based on a usage frequency of the variable, to determine an address at which a value of the variable is stored in the memory based on the priority of the variable, and to generate a command that relates to the variable based on a bit string length of the address.

When a usage frequency of a first variable of the program is greater than a usage frequency of a second variable of the program, the controller may be further configured to determine the first variable to have a priority that is higher than a priority of the second variable.

A bit string length of a first address at which a value of the first variable is stored may be shorter than a bit string length of a second address at which a value of the second variable is stored.

The controller may be further configured to obtain a respective usage frequency of each of a plurality of variables by using at least one from among a dependence analysis and a loop depth analysis.

The controller may be further configured to calculate a layout of the memory to which respective values of a plurality of variables of the program are allocated, and to determine, in the calculated layout, whether the respective values of the plurality of variables are validly stored in the memory by using a command with respect to the plurality of variables.

When the respective values of the plurality of variables are determined as being validly stored in the memory, the controller may be further configured to access the plurality of variables by using the command.

When the respective values of the plurality of variables are determined as being not validly stored in the memory, the controller may be further configured to provide an error message.

The controller may be further configured to select one from among the plurality of variables of the program, and to determine the priority of the selected variable.

The controller may be further configured to select the one from among the plurality of variables based on at least one from among profile data and preset information.

The address at which the value of the variable is stored may be determined based on a reference position, and the reference position may be variable.

BRIEF DESCRIPTION OF THE DRAWINGS

These and/or other aspects will become apparent and more readily appreciated from the following description of exemplary embodiments, taken in conjunction with the accompanying drawings, in which reference numerals denote structural elements, wherein.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are described below, by referring to the figures, merely to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

The terms used in this specification are those general terms currently widely used in the art in consideration of functions in regard to the exemplary embodiments, but the terms may vary according to the intention of those of ordinary skill in the art, precedents, or new technology in the art. In addition, specified terms may be selected by the applicant, and in this case, the detailed meaning thereof will be described in the detailed description of the exemplary embodiments. Thus, the terms used in the specification should be understood not as simple names but based on the meaning of the terms and the overall description of the exemplary embodiments.

Throughout the specification, when a portion "includes" an element, another element may be further included, rather than excluding the existence of the other element, unless otherwise described. In addition, the term "unit" used in the specification may denote an element composed of hardware, such as a field programmable gate array (FPGA) or an application-specific integrated circuit (ASIC), or software, and may perform a particular task. However, the "unit" is not limited to software and hardware and may include a non-transitory storage medium containing instructions for addressing and controlling at least one processor. Thus, the "unit" may include, for example, components such as software components, object-oriented software components, class components and task components, and processes, functions, attributes, procedures, subroutines, segments of program codes, drivers, arrays, and variables. The functions provided by the components may be combined and assigned to a smaller number of components or other "units" or may be further divided and assigned to additional components or other "units".

While such terms as "first," "second," etc., may be used to describe various elements, such elements must not be limited to the above terms. The above terms are used only to distinguish one element from another. For example, without departing from the scope of rights of the specification, a first element may be referred to as a second element, and similarly, the second element may be referred to as the first element. As used herein, the term "and/or" includes any and all combinations of one or more of the associated listed items.

The present inventive concept will now be described more fully with reference to the accompanying drawings, in which exemplary embodiments of the present inventive concept are shown. The present inventive concept may, however, be embodied in many different forms and should not be construed as being limited to the exemplary embodiments set forth herein; rather, these exemplary embodiments are provided so that this disclosure will be thorough and complete, and will fully convey the present inventive concept to those of ordinary skill in the art.

Figure 1:
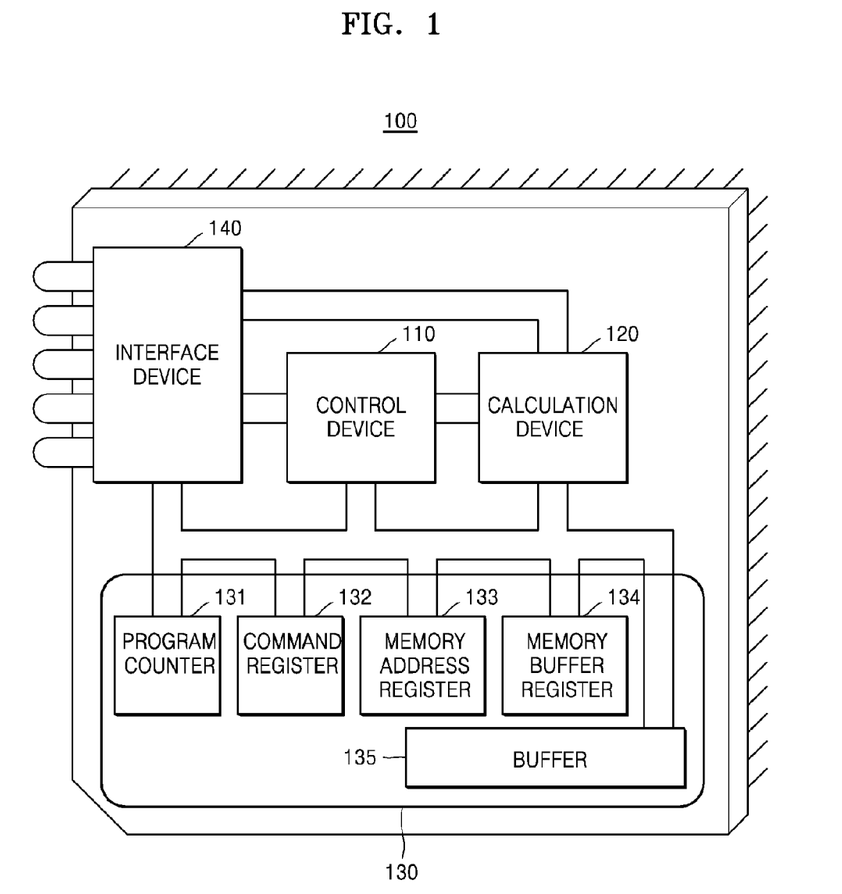
FIG. 1 is a block diagram of a central processing unit (CPU) related to a processor, according to an exemplary embodiment.

FIG. 1 is a block diagram of a central processing unit (CPU) 100 related to a processor, according to an exemplary embodiment.

According to an exemplary embodiment, the CPU 100 may include a control device 110, a calculation device 120, a register 130, and an interface device 140. However, not all of the illustrated elements are essential elements. The CPU 100 may be implemented by using more or less elements than the illustrated elements. Hereinafter, the elements will be described.

The control device 110 is configured to direct and control an operation of devices included in the CPU 100. The control device 110 decodes a command read from a main memory and transmits the decoded command to a device that corresponds to the decoded command. The control device 110 may include any of a decoder, an encoder, a control address register (CAR), a control buffer register (CBR), a control memory device, and an order control module, but is not limited thereto.

The decoder may be configured to decode a command of the command register 132, and the encoder may be configured to generate a control signal to be transmitted to each device based on the decoded command. The control address register is configured to store an address of a micro command to be executed, and the control buffer register is configured to temporarily store micro command bits read from the control memory device. The control memory device is an internal memory device which is configured to store a micro program that includes micro commands. The order control module is a set of circuits that is configured to determine an execution order of micro commands.

The calculation device 120 is a device that is configured to receive a command of the control device 110 in order to perform actual calculation. In detail, the calculation device 120 performs calculations such as arithmetic operations, logic operations, relationship operations, or shift operations. The calculation device 120 may include, for example, any of an adder, an accumulator, a complementer, a data register, an overflow detector, and/or a shift register.

The register 130 is a temporary memory that is configured to temporarily store commands to be processed by the CPU 100 and/or an intermediate result value of a calculation. The register 130 may be formed by connecting flip flops or latches in parallel with one another. Examples of data transmission between registers are serial transmission, parallel transmission, and bus transmission. Serial transmission is also referred to as serial shift micro operation, and is slower than parallel transmission. Parallel transmission is a transmission method in which all bits in a register are simultaneously transmitted during a single clock pulse. In bus transmission, a single path is used by all registers, and thus the number of wirings may be reduced.

The register 130 may include a program counter 131, a command register 132, a memory address register 133, a memory buffer register 134, and an accumulator 135. The program counter 131 is configured to store an address of a command to be executed next, and the command register 132 is configured to store details of a command that is currently being executed. The memory address register 133 is an address storage register which is configured to store an address of a main memory required to perform a read and/or writing operation. The memory buffer register 134 is configured to temporarily store data that enters or exits a memory device.

In addition, the register 130 may further include a state register, an index register, a data register, a shift register, and a major status register (not shown). The state register may be configured to store information that relates to a program state word, and the program state word refers to information in which an instantaneous internal state of a system is written. The index register is configured to count the number of times an address changes or the number of times of calculations are repeated in a program. The shift register is configured to shift a stored value to the left or to the right by one bit each time, and is used in serial transmission. The major status register is configured to store a major status of the CPU 100.

While particular elements of the CPU 100 are illustrated in FIG. 1, they are provided to help understand the exemplary embodiments overall, and it will be apparent to one of ordinary skill in the art that one or more exemplary embodiments may also be implemented without the particular elements. In addition, it will be apparent to one of ordinary skill in the art that general-use elements other than the elements illustrated in FIG. 1 may be further included.

Figure 2:
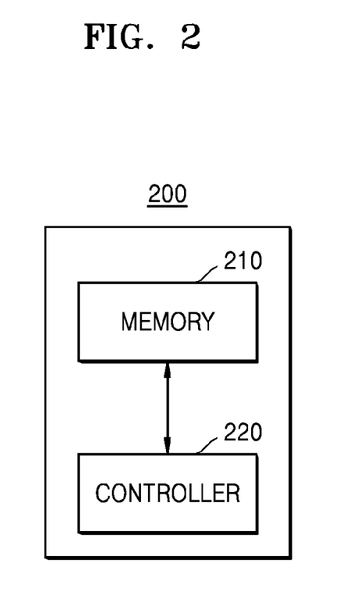
FIG. 2 is a block diagram of a processor, according to an exemplary embodiment.

FIG. 2 is a block diagram of a processor 200, according to an exemplary embodiment.

According to an exemplary embodiment, the processor 200 may include a memory 210 and a controller 220. However, not all of the illustrated elements are essential elements. The processor 200 may be implemented by using more or less elements than the illustrated elements. Hereinafter, the elements will be described.

The memory 210 may be configured to store values of variables of a program. When a variable is used by declaring the same in a program, an area that relates to the variable is created in the memory 210. In order to write or read a value of a variable, an address of the variable is to be stored in a register, and a command for writing or reading the value of the variable to or from the address referred to from the register is required.

The controller 220 is configured to determine a priority of a variable of a program based on a usage frequency of the variable. The controller 220 is further configured to determine an address at which a value of a variable is stored, based on the priority. The controller 220 is further configured to determine a command that relates a variable based on a length of a bit string of the determined address. In addition, the controller 220 may be further configured to determine the number of commands with respect to a variable based on a length of a bit string of an address. For example, in the case of 32 bit strings, three commands are needed to read and/or write a value of a variable (a). In detail, for example, commands are setlo, sethi, and st. Conversely, in the case of 16 bit strings, two commands are needed to read and/or write a value of a variable (a). The commands are setlo and st. In addition, in the case of 8 bit strings, one command is needed to read and/or write a value of a variable (a). The command is sta. The above-described number and types of commands that are required based on bit strings are exemplary, and one of ordinary skill in the art may variably set the number and types of commands by adding to or modifying the above examples.

The controller 220 may be further configured to obtain a respective usage frequency of each of a plurality of variables of a program, and to determine respective priorities of the plurality of variables based on the respective usage frequency. The plurality of variables may include a first variable and a second variable. In addition, a first address stores a value of the first variable, and a second address stores a value of the second variable. If a priority of the second variable is lower than a priority of the first variable, a bit string length of the first address may be shorter than a bit string length of the second address.

The controller 220 is further configured to calculate a layout of the memory 210 to which respective values of the plurality of variables of the program are allocated. The controller 220 may be further configured to determine whether a respective value of a particular variable is validly stored in the memory 220 by using a command with respect to the variable in the calculated layout. If a value of a particular variable is determined as being validly stored in the memory 210, the controller 220 may be further configured to access the particular variable by using a command. If a value of a particular variable is determined as being not validly stored in the memory 210, the controller 220 may be further configured to provide an error message.

The controller 220 may be configured to select one of the plurality of variables of the program. In detail, the controller 220 may select a variable from among the plurality of variables by using profile data or based on preset information. Profile data may include data that includes names of variables and respective usage frequencies of the variables. The controller 220 may select a variable that has a usage frequency that is equal to or greater than a predetermined frequency, from among the plurality of variables. Profile data may be obtained by using the processor 200 executing a program, or may include data that is arbitrarily input to the processor 200 by a user.

An address at which a value of a variable is stored may be determined based on a reference position, and the reference position may be variable.

The processor 200 may include a central operation processor configured to control operations of the memory 210 and the controller 220 overall. The central calculation processor may be formed as an array of a plurality of logic gates or as a combination of a general-use microprocessor and the memory 210, in which a program which is executable in the microprocessor is stored. In addition, the processor 200 may also be implemented as hardware of another type, as will be apparent to one of ordinary skill in the art.

Hereinafter, various operations or applications performed by the processor 200 will be described. Even though the memory 210 or the controller 220 is specified below, details that are clearly apparent and understandable to one of ordinary skill in the art may be regarded as a general implementation, and the scope of the present inventive concept is not limited by a name or a physical or logical structure of a specific element.

Figure 3:
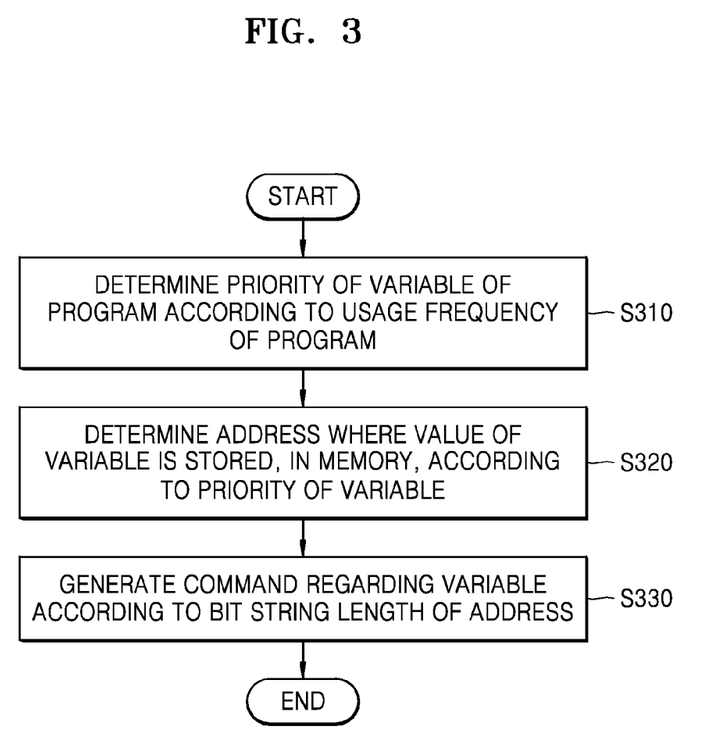
FIG. 3 is a flowchart of a command processing method, according to an exemplary embodiment.

FIG. 3 is a flowchart of a command processing method, according to an exemplary embodiment.

In operation S310 of FIG. 3, the processor 200 determines a priority of a variable of a program based on a usage frequency of the variable.

In operation S320, the processor 200 determines an address at which a value of the variable is stored in the memory 210, based on the determined priority of the variable.

In operation S330, the processor 200 determines a command that relates to the variable based on a length of a bit string of the address.

Figure 4:
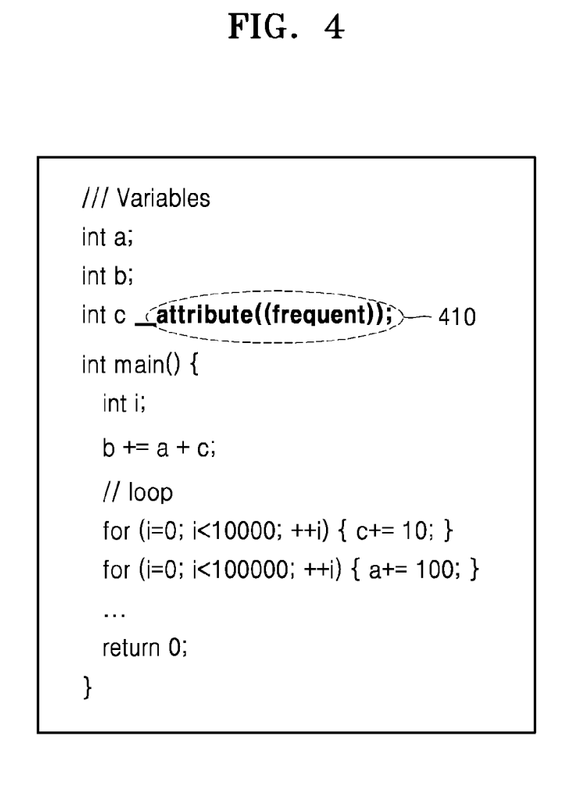
FIG. 4 is a view for explaining a code of a program, according to an exemplary embodiment.

FIG. 4 is a view for explaining a code of a program, according to an exemplary embodiment.

Referring to FIG. 4, variables a, b, and c are defined. The processor 200 may determine priorities of the variables a, b, and c based on respective usage frequencies of the variables a, b, and c. The processor 200 compiles a program as illustrated in FIG. 4. When the processor 200 performs compiling, lexical analysis, syntax analysis, semantic analysis, generation of an intermediate code (IR generation), and/or the like are performed. The processor 200 may obtain information that relates to a usage frequency of a variable by reading the variable in each stage.

According to an exemplary embodiment, when compiling the program as illustrated in FIG. 4, the processor 200 may obtain usage frequencies of respective variables. The usage frequencies of the variables are shown in Table 1 below.

TABLE 1

| NAME OF VARIABLE | USAGE FREQUENCY |
|---|---|
| a | 20001 |
| b | 2 |
| c | 20001 |

The processor 200 may set a higher priority on a variable that has a greater usage frequency. In this case, priorities may be in a descending order of a, c, and b.

In addition, the processor 200 may obtain respective usage frequencies with respect to only preset variables. The processor 200 may also obtain usage frequencies with respect to variables that are marked as frequently used variables as indicated by 410 in FIG. 4. Frequently used variables may be directly set by a user or set by using profile data.

According to another exemplary embodiment, when referring to FIG. 4, the processor 200 may predict a usage frequency of a variable by using at least one of a dependence analysis and a loop depth analysis. Predicted usage frequencies are as shown in Table 2 below.

TABLE 2

| NAME OF VARIABLE | PREDICTED USAGE FREQUENCY | PRIORITY POINT |
|---|---|---|
| a | 1 + 10 × 2 | 21 |
| b | 1 | 1 |
| c | 1 + 10 × 2 | 21 |

The processor 200 may determine that a variable used inside a loop is more frequently used than a variable used outside the loop. The processor 200 may give a priority point to each variable based on a respective predicted usage frequency.

Figure 5:
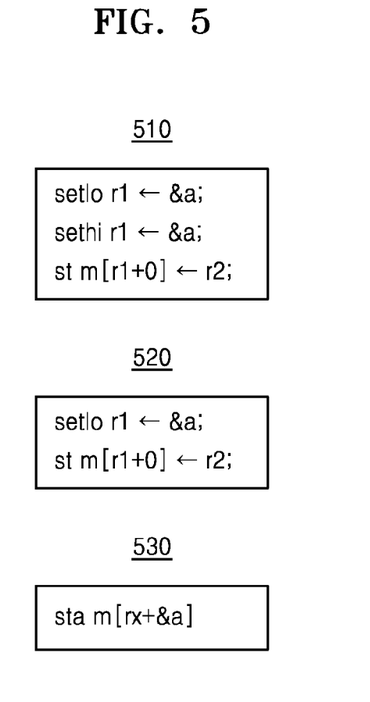
FIG. 5 is a view for explaining a command which is based on a length of a bit string of an address at which a value of a variable is stored, according to an exemplary embodiment.

FIG. 5 is a view for explaining a command based on a length of a bit string of an address at which a value of a variable is stored, according to an exemplary embodiment.

The processor 200 may determine an address at which a value of a variable is stored in the memory 210, based on a priority of the variable. In addition, the processor 200 may check a load command or a store command that are access variables, in an Industry Standard Architecture (ISA) of a processor that is to execute a program, and generate a required command. The ISA refers to a bus design standard that facilitates data transmission by connecting a CPU with various peripheral devices.

As illustrated in FIG. 5, each command in Diagrams 510, 520, and 530 is used for reading or writing a value of a variable (a).

Diagram 510 illustrates a command which is used when a bit string length of an address is 32 bits. In particular, the lower 16 bits that indicate an address of the variable (a) are stored in the lower 16 bits of register r1; the upper 16 bits that indicate the address of the variable (a) are stored in the upper 16 bits of register r1; and a value of r2 is stored in an address of the memory indicated by register r1. When a bit string length of an address is 32 bits, three commands are needed.

Diagram 520 illustrates a command which is used when a bit string length of an address is 16 bits. In particular, the lower 16 bits that indicate an address of a variable (a) are stored in the lower 16 bits of register r1; and a value of r2 is stored in an address of the memory indicated by register r1. When a bit string length of an address is 16 bits, two commands are needed.

Diagram 530 illustrates a command which is used when a bit string length of an address is 8 bits. In particular, Diagram 530 illustrates that a value of r2 is stored in an address of the memory which is a sum of rx and an address of a variable (a). In this aspect, rx may indicate a zero register. When a bit string length of an address is 8 bits, one command is needed.

Referring to FIG. 5, even when the same operation is performed, the number of commands may vary based on a length of a bit string with respect to an address of a variable. Accordingly, if an address at which a value of a variable is stored is expressed with a short bit string, the address may be accessed faster, thereby improving program performance.

The processor 200 may determine respective priorities of each of a plurality of variables of a program according to corresponding usage frequencies of the variables, and determine corresponding addresses at which values of the plurality of variables are stored based on the respective priorities of the variables. In the case of a variable of a first priority with a greatest usage frequency, an address at which a value of the variable of the first priority is stored may be set to be in an 8-bit space of the memory, thereby increasing a processing speed of a program by quickly accessing the variable of the first priority.

Figure 6:
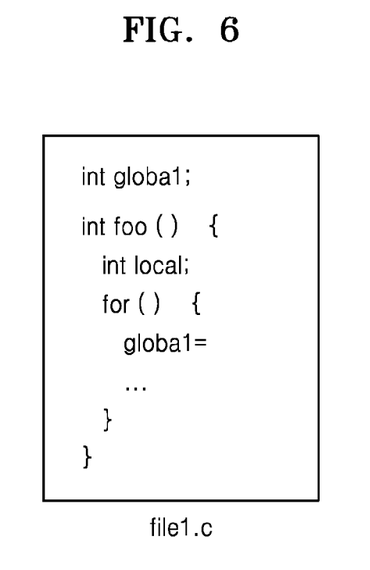
FIG. 6 is a view for explaining a code of a program, according to another exemplary embodiment.

FIG. 6 is a view for explaining a code of a program, according to another exemplary embodiment. FIG. 6 illustrates a portion of a code with respect to a program that includes a global variable.

Figure 7:
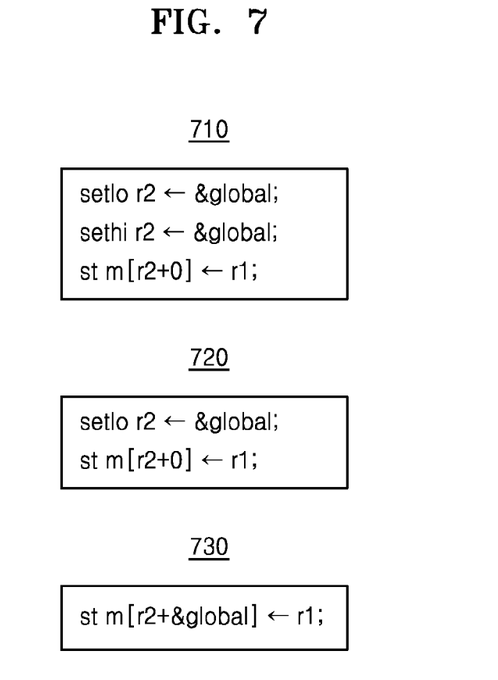
FIG. 7 is a view for explaining a command which is based on a length of a bit string of an address at which a value of a variable is stored, according to another exemplary embodiment.

FIG. 7 is a view for explaining a command which is based on a length of a bit string of an address at which a value of a variable is stored, according to another exemplary embodiment.

Diagram 710 is a view for illustrating a command used for reading and/or writing a global variable when a bit string length of an address is 32 bits. The processor 200 stores an address of the global variable in register r2 by using two commands, setlo and sethi, to write a value of a variable global of file1.c. The processor 200 reads a value of register r2 and stores a value of register r1 in the memory indicated by register r2. In this aspect, when a bit string length of an address is 32 bits, three commands are required.

Referring to Diagram 720, when a bit string length of an address is 16 bits, two commands are required to read and/or write a global variable.

Referring to Diagram 730, when a bit string length of an address is 8 bits, one command is required for reading and/or writing a global variable.

When an address at which a value of a first variable is stored may be expressed as 16 bits or 8 bits, two commands or one command may be used for reading and/or writing the first variable. Thus, if space of the memory 210 is limited, a priority of a variable may be determined based on a usage frequency of the variable, and an address of a variable that has a high priority may be set with small bits, and in this manner, a processing speed of a program may be increased by reducing the number of required commands. The commands described with reference to FIG. 7 are examples of commands that are based on a bit string length of an address at which a value of a variable is stored, and one of ordinary skill in the art may set commands by adding or modifying other different commands.

Figure 8:
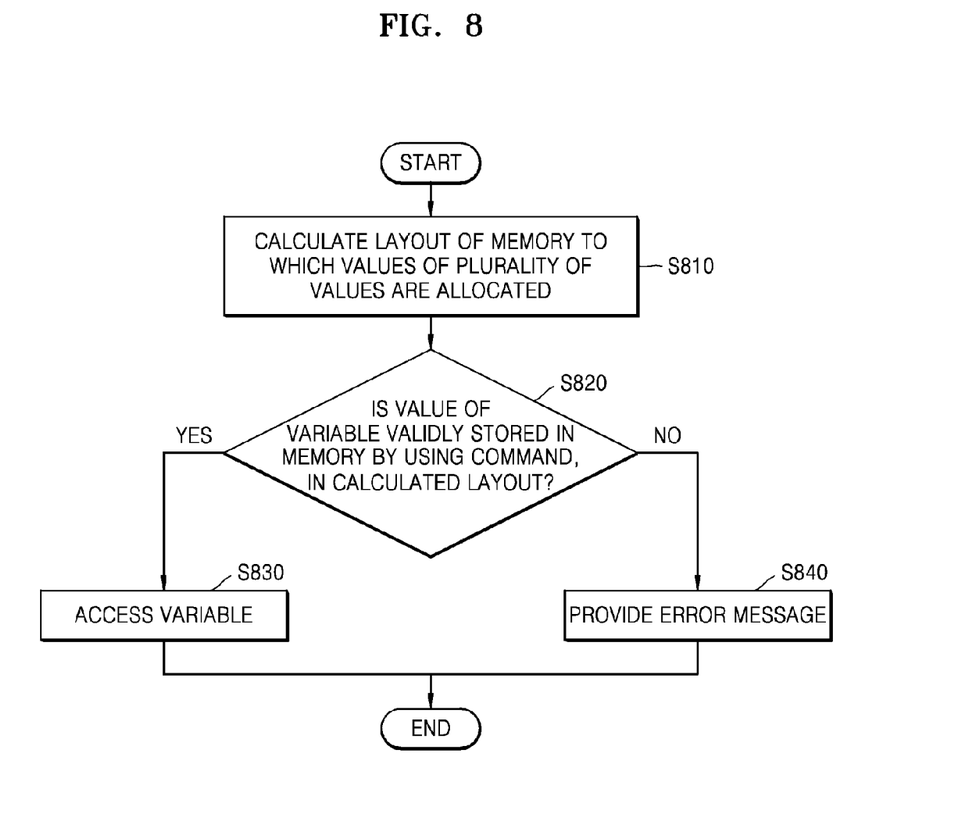
FIG. 8 is a flowchart of a command processing method, according to another exemplary embodiment.

FIG. 8 is a flowchart of a command processing method, according to another exemplary embodiment.

In operation S810 of FIG. 8, the processor 200 calculates a layout of the memory 210 to which respective values of a plurality of variables of a program are allocated.

In operation S820, the processor 200 checks whether a value of a variable is validly stored in the memory 210 by using a command, with respect to the calculated layout.

In operation S830, when a value of a variable is determined as being validly stored in the memory 210, the processor 200 may access the variable by using the command.

In operation S840, when a value of a variable is determined as being not validly stored in the memory 210, the processor 200 provides an error message.

Figure 9:
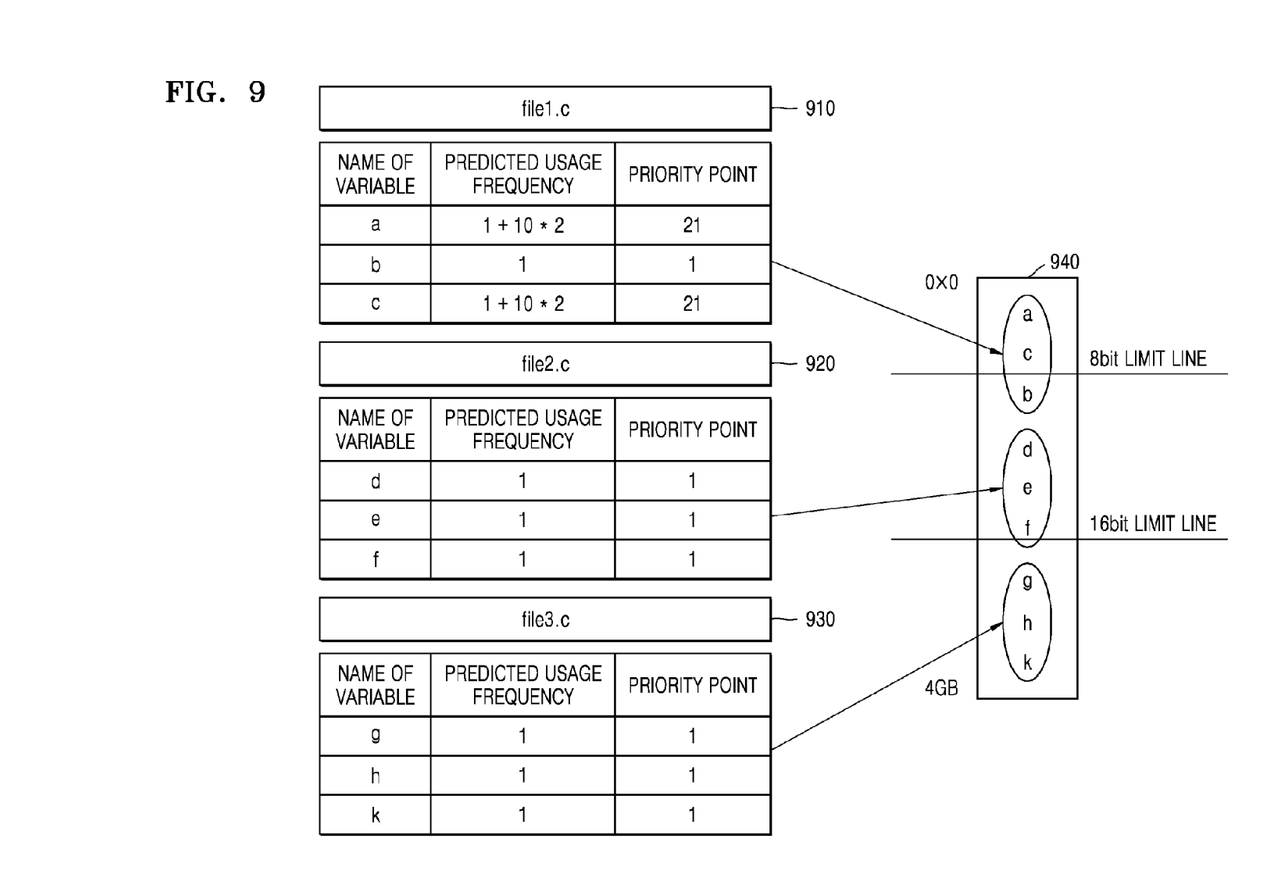
FIG. 9 is a view for explaining a layout of a plurality of variables, according to an exemplary embodiment.

FIG. 9 is a view for explaining a layout of a plurality of variables, according to an exemplary embodiment.

The processor 200 calculates space occupied by a plurality of variables in the memory 210 by using information that relates to the plurality of variables used in files of a program and information that corresponds to previous stages before executing the program currently. A process of calculating space of the memory 210 occupied by the plurality of variables is referred to as determining a layout. Information that relates to the plurality of variables may include at least one of respective names and respective sizes of each of the plurality of variables and corresponding addresses at which values of the variables are respectively stored.

The processor 200 may determine whether a value of a variable that corresponds to a command is validly stored in the memory 210 by using a command determined in operation S330 with respect to the calculated layout.

Referring to FIG. 9, files of a program include file1.c (i.e., item 910), file2.c (i.e., item 920), and file3.c (i.e., item 930). Variables are included in each file. The processor 200 may obtain a respective predicted usage frequency of a corresponding variable by using an analysis method of a compiler. Examples of the analysis method of the compiler may be at least one of a dependence analysis and a loop depth analysis, and are not limited thereto.

In file1.c (i.e., item 910), each of variables a and c has a high priority. Variable b included in file1.c (i.e., item 910) and variables included in file2.c (i.e., item 920) and file3.c (i.e., item 930) have the same predicted usage frequency and thus have the same priority point. Thus, the processor 200 may determine an address that has a short bit string length as an address with respect to a variable based on the respective priorities of the variables.

Referring to Diagram 940, the variables a and c included in file 1.c (i.e., item 910) are allocated to 8-bit memory space from within a 4 GB memory, and the variable b included in file1.c (i.e., item 910) and the variables included in file2.c (i.e., item 920) and file3.c (i.e., item 930) are each allocated to 16-bit memory space from within the 4 GB memory, and the variables included in file3.c (i.e., item 930) are allocated to 32-bit memory space from within the 4 GB memory.

The processor 200 may determine a layout with respect to the variables included in file1.c (i.e., item 910), file2.c (i.e., item 920), and file3.c (i.e., item 930), and may determine whether respective values of variables corresponding to commands are validly stored in the memory 210 by using the commands that are determined based on the corresponding priorities.

When a value of a variable is determined as being validly stored in the memory 210, the processor 200 may access the variable by using a command corresponding to the variable. Conversely, when a value of a variable is determined as being not validly stored in the memory 210, the processor 200 may provide an error message. In this case, the processor 200 may provide a message stating that a value of a predetermined variable is not validly stored in the memory 210. For example, when variable c is allocated to space of 8-bit memory 210, and another value is allocated to the space of the 8-bit memory 210 and thus there is no empty space, the processor 200 may provide an error message which indicates that a program is not executable by using a command based on a priority.

The processor 200 may provide an error message with respect to variables that are not validly stored in the memory 210 from among the plurality of variables. The processor 200 may cancel execution of a command based on a priority of a variable only with respect to those variables that are determined as being not validly stored in the memory 210.

The processor 200 may determine an address at which a value of a variable is stored based on a reference position. Referring to Diagram 530 of FIG. 5, rx may correspond to a reference position. The processor 200 may change the reference position from a first position to a second position. The processor 200 reflects the changed reference position when calculating an address at which a value of a variable is to be stored.

Figure 10:
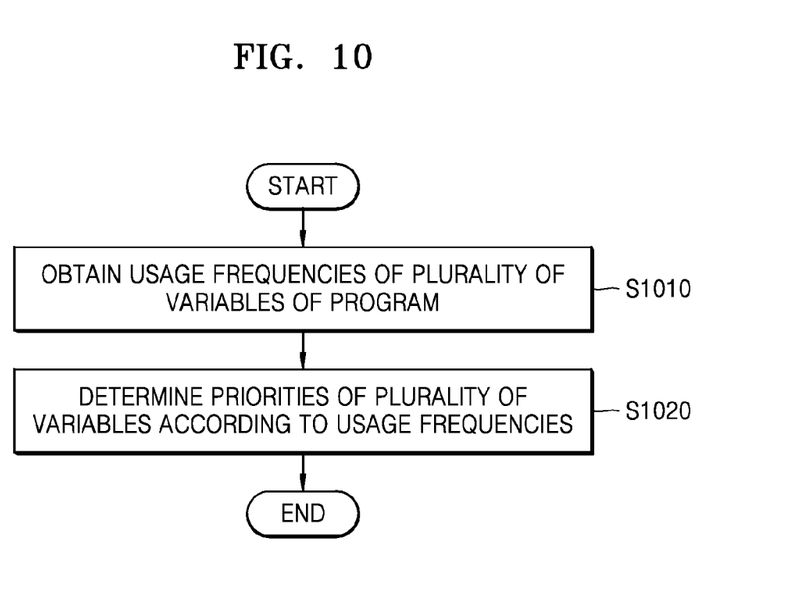
FIG. 10 is a flowchart of a method for determining priorities of variables, according to an exemplary embodiment.

FIG. 10 is a flowchart of a method for determining priorities of variables, according to an exemplary embodiment.

In operation S1010 of FIG. 10, the processor 200 obtains respective usage frequencies of each of a plurality of variables of a program. The processor 200 may obtain the usage frequencies of the variables by compiling the program, and may obtain predicted usage frequencies of the variables by using an analysis method of a compiler, such as a dependence analysis and a loop depth analysis.

In operation S1020, the processor 200 determines respective priorities of each of the plurality of variables based on the respective usage frequencies of the corresponding variables. The processor 200 may calculate a respective priority point of each of the variables based on the respective predicted usage frequency of each of the variables and determine a respective priority of each of the variables based on the calculated priority point.

Apparatuses described above may be realized by any of a hardware component, a software component, and/or a combination of hardware component and software component. For example, apparatuses and components described in the above exemplary embodiments may be realized by using at least one of general purpose computers or special purpose computers, such as any of a processor, an arithmetic logic unit (ALU), a digital signal processor, a microcomputer, a field programmable array (FPA), a programmable logic unit (PLU), a microprocessor, and/or other apparatuses which are capable of performing an instruction and responding.

A processing apparatus may have an operation system (OS) or at least one software application to be performed on the operating system. In addition, the processing apparatus may respond to an execution of software, and may access, store, manipulate, process and generate data.

For convenience of understanding, the processing apparatus is described as including a single processing element in some cases. However, it will be apparent to one of ordinary skill in the art that the processing apparatus may include a plurality of processing elements which may be of the same type or a plurality of types. For example, the processing apparatus may include a plurality of processors or one processor and one controller. In addition, other processing configurations, such as a parallel processor, may be possible.

Software may include any of a computer program, a code, an instruction, and/or a combination of at least one of them, and may be executed so that the processing apparatus operates as desired or may independently or collectively control the processing apparatus.

Software and/or data may be embodied, in order to be interpreted by the processing apparatus or to provide a command or data to the processing apparatus, in any of a type of a machine, a component, a physical apparatus, virtual equipment, computer storing medium or apparatus, or a transmitted signal wave, either permanently or temporarily. Software may be distributed to computer systems connected via a network, and may be stored or executed in a distributed manner. Software and/or data may be stored in at least one non-transitory computer-readable recording medium.

The present inventive concept can also be embodied as computer readable codes stored on a non-transitory computer-readable recording medium. The non-transitory computer-readable recording medium may include any data storage device that can store programs or data which can be thereafter read by a computer system. Program codes to be recorded on such a medium can be particularly designed and configured according to the present inventive concept, or any readily available medium publicly known to one of ordinary skill in the art of computer software may be used.

The non-transitory computer-readable recording medium may include any data storage device that can store programs or data which can be thereafter read and executed by a computer system, hardware processor or integrated circuit. Examples of the computer readable recording medium include optical media such as read-only memory (ROM), random-access memory (RAM) and CD-ROMs, magneto-optical media such as floptical disk, and specially configured hardware devices configured to store and execute program commands, such as ROM, RAM and floppy disks.

An example of a program command may include not only a machine language code, such as a product produced by a compiler, but also a high-level language code which is executable by a computer by using an interpreter, etc.

The hardware apparatus described above may be configured to operate as at least one software module in order to perform operations described in the above exemplary embodiments, or vice versa.

While the present inventive concept have been particularly shown and described with reference to the exemplary embodiments and the drawings, it will be understood by those of ordinary skill in the art that various changes in form and details may be made based on the above description. For example, appropriate results may also be achieved when the described techniques are performed in a different order from the described method, and/or when elements such as systems, structures, devices or circuits described above are coupled or combined in a different form than in the description, or are replaced or substituted by other elements or equivalents.

Therefore, the scope of the present inventive concept is defined not by the detailed description but by the appended claims and equivalents of the claims.

It will be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A command processing method comprising:
   determining a priority of a variable of a program based on a usage frequency of the variable, wherein the priority of the variable is set to a higher priority as the usage frequency of the variable is higher;
   determining an address at which a value of the variable is stored in a memory based on the priority of the variable, wherein the address of the variable having the higher priority is set with lower bits; and
   determining at least one command that relates to the variable and a number of the at least one command based on a bit string length of the address.

2. The command processing method of claim 1, wherein the determining the priority of the variable comprises determining, when a usage frequency of a first variable of the program is greater than a usage frequency of a second variable of the program, the first variable to have a priority that is higher than a priority of the second variable.

3. The command processing method of claim 2, wherein a bit string length of a first address at which a value of the first variable is stored is shorter than a bit string length of a second address at which a value of the second variable is stored.

4. The command processing method of claim 2, wherein the determining the priority the variable further comprises obtaining a respective usage frequency of each of a plurality of variables by using at least one from among a dependence analysis and a loop depth analysis.

5. The command processing method of claim 1, further comprising:

calculating a layout of the memory to which respective values of a plurality of variables of the program are allocated; and determining, in the calculated layout, whether the respective values of the plurality of variables are validly stored in the memory by using the at least one command with respect to the plurality of variables.

6. The command processing method of claim 5, further comprising, when the respective values of the plurality of variables are determined as being validly stored in the memory, accessing the plurality of variables by using the at least one command.

7. The command processing method of claim 5, further comprising, when the respective values of the plurality of variables are determined as being not validly stored in the memory, providing an error message.

8. The command processing method of claim 1, further comprising selecting one from among a plurality of variables of the program, wherein the determining the priority of the variable comprises determining the priority of the selected variable.

9. The command processing method of claim 8, wherein the selecting the one from among the plurality of variables comprises selecting the one from among the plurality of variables based on at least one from among profile data and preset information.

10. The command processing method of claim 1, wherein the address at which the value of the variable is stored is determined based on a reference position, and
wherein the reference position is variable.

11. A processor comprising:
a memory; and
a controller configured to:
determine a priority of a variable of a program based on a usage frequency of the variable, wherein the priority of the variable is set to a higher priority as the usage frequency of the variable is higher,
determine an address at which a value of the variable is stored in the memory based on the priority of the variable, wherein the address of the variable having the higher priority is set with lower bits, and
determine at least one command that relates to the variable and a number of the at least one command based on a bit string length of the address.

12. The processor of claim 11, wherein when a usage frequency of a first variable of the program is greater than a usage frequency of a second variable of the program, the controller is further configured to determine the first variable to have a priority that is higher than a priority of the second variable.

13. The processor of claim 12, wherein a bit string length of a first address at which a value of the first variable is stored is shorter than a bit string length of a second address at which a value of the second variable is stored.

14. The processor of claim 12, wherein the controller is further configured to obtain a respective usage frequency of each of a plurality of variables by using at least one from among a dependence analysis and a loop depth analysis.

15. The processor of claim 11, wherein the controller is further configured to calculate a layout of the memory to which respective values of a plurality of variables of the program are allocated, and to determine, in the calculated layout, whether the respective values of the plurality of variables are validly stored in the memory by using the at least one command with respect to the plurality of variables.

16. The processor of claim 15, wherein when the respective values of the plurality of variables are determined as being validly stored in the memory, the controller is further configured to access the plurality of variables by using the at least one command.

17. The processor of claim 15, wherein when the respective values of the plurality of variables are determined as being not validly stored in the memory, the controller is further configured to provide an error message.

18. The processor of claim 11, wherein the controller is further configured to select one from among a plurality of variables of the program, and to determine the priority of the selected variable.

19. The processor of claim 18, wherein the controller is further configured to select the one from among the plurality of variables based on at least one from among profile data and preset information.

20. The processor of claim 11, wherein the address at which the value of the variable is stored is determined based on a reference position, and
wherein the reference position is variable.

* * * * *